March 11, 1947. C. H. TRIMBLE 2,417,144
ARTICLE HOLDING FIXTURE
Filed Oct. 19, 1943 2 Sheets-Sheet 1
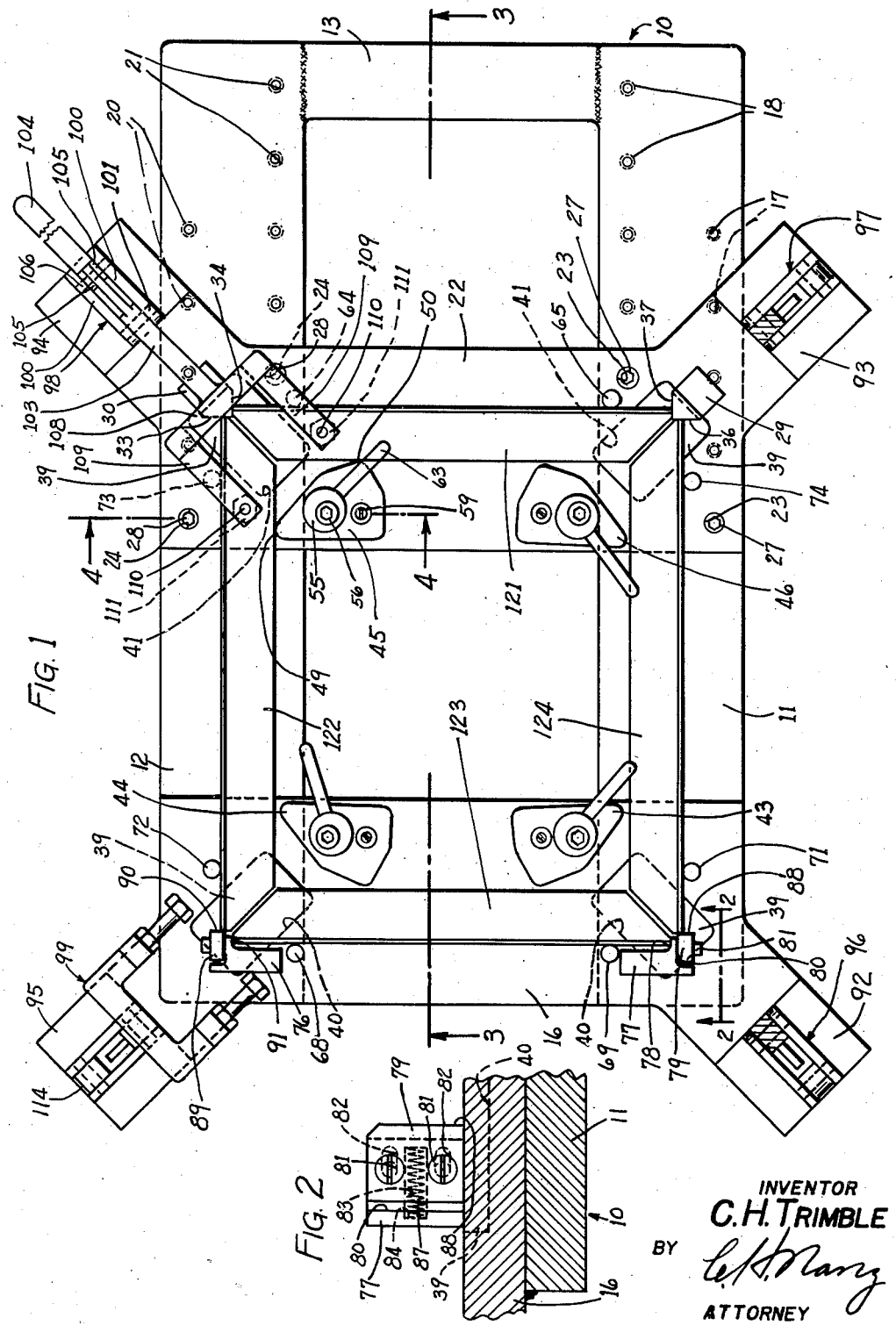
INVENTOR
C.H. TRIMBLE
BY
ATTORNEY

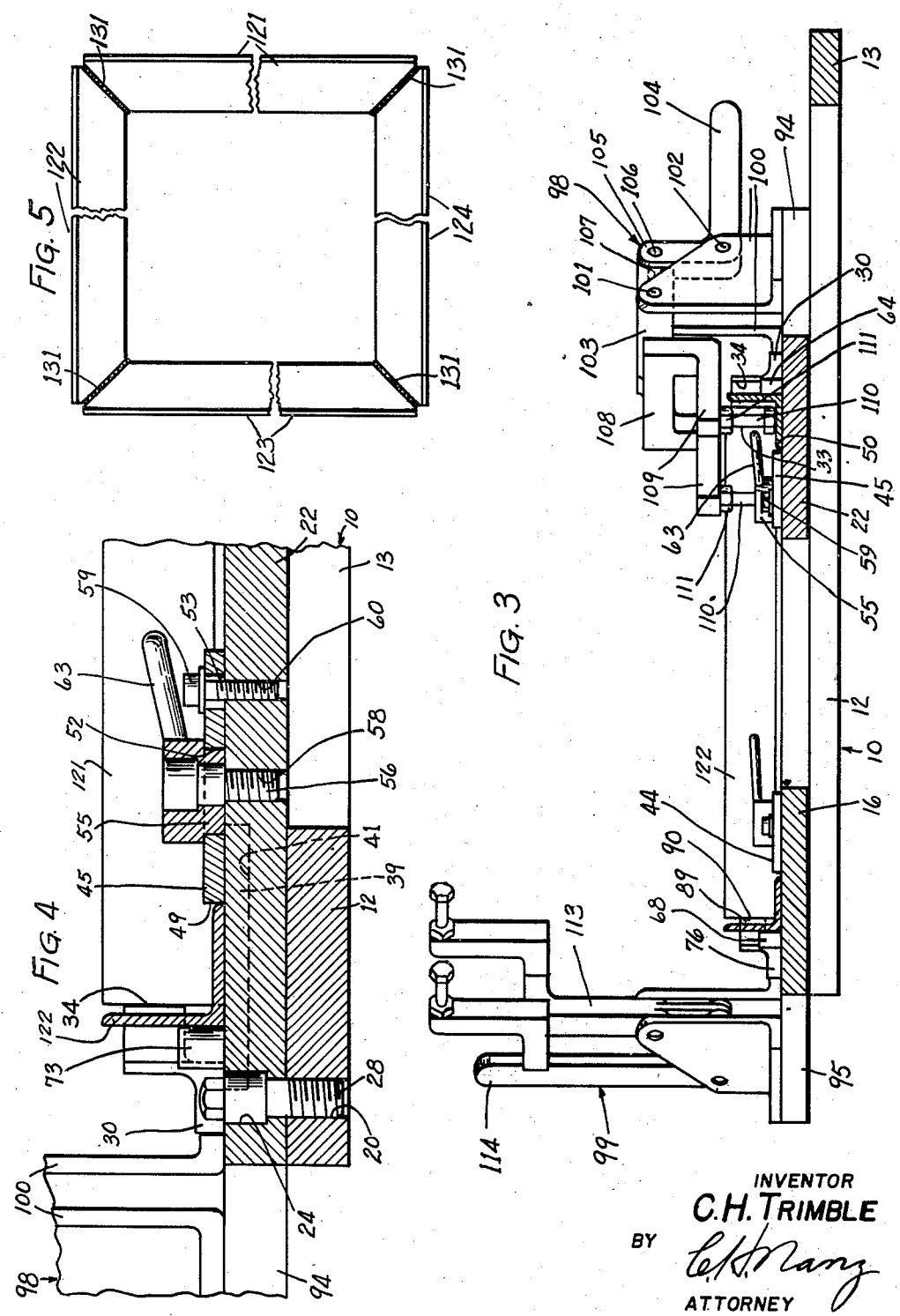

Patented Mar. 11, 1947

2,417,144

UNITED STATES PATENT OFFICE 2,417,144

ARTICLE HOLDING FIXTURE

Charles H. Trimble, Baltimore, Md., assignor to Western Electric Company, Incorporated, New York, N. Y., a corporation of New York Application October 19, 1943, Serial No. 506,853

8 Claims. (Cl. 113—99)

This invention relates to article holding fixtures and more particularly to fixtures for holding a plurality of articles to be assembled.

In welding a plurality of angle irons into a frame, it is necessary to retain the individual angle irons in spaced relationship to each other so that just the correct amount of distance separates them for the most suitable welding.

It is an object of this invention to provide new and improved article holding fixtures.

One embodiment of the invention comprises a fixture for welding rectangular frame assemblies including a plate having a plurality of copper inserts secured therein at welding positions to prevent welded parts from adhering thereto, gauges adjacent to the corners of the plate, cam means for forcing frame members to be welded against the gauges, clamps at the corners of the plate for securing the frame members during the welding operation, and means for adjusting the relative positions of several elements to accommodate frames of different sizes.

The invention may be completely understood from the following detailed description of a specific embodiment thereof, taken with the annexed drawings, in which Fig. 1 is a plan view of an article holding fixture embodying the invention;

Fig. 2 is a fragmentary vertical sectional view taken along the line 2—2 of Fig. 1;

Fig. 3 is a vertical sectional view taken along the line 3—3 of Fig. 1;

Fig. 4 is a fragmentary vertical sectional view taken along the line 4—4 of Fig. 1, and Fig. 5 is a fragmentary plan view of a frame of the type that may be assembled in the article holding fixture.

Referring now to Fig. 1 of the drawings, the fixture illustrated therein comprises a U-shaped frame 10 having a pair of parallel arms 11 and 12 joined at one end by a member 13 and having secured thereto at the other end thereof a clamping plate 16. The arm 11 has a plurality of apertures 17—17 and 18—18 therein which are spaced in two parallel lines along the length of the arm. The arm 12 has similar apertures 20—20 and 21—21 spaced in parallel lines therealong. Each of the apertures 17—17 and 18—18 is at a distance from the plate 16 equal to the distance at which one of the apertures 20—20 and 21—21, respectively, is spaced from the plate 16. A second end plate 22 having a pair of apertures 23—23 at one end and a similar pair 24—24 at the other end thereof is adjustably secured to the arms 11 and 12 by means of bolts 27—27 and 28—28 passing through the apertures 23—23 and 24—24, respectively, and each threaded through one of the apertures 17—17, 18—18, 20—20 and 21—21, respectively.

Gauges 29 and 30 are secured to the plate 22 at opposite ends thereof. The gauge 30 has surfaces 33 and 34 formed thereon perpendicular to each other, the surface 34 being parallel to the arms 11 and 12 and the surface 33 being perpendicular thereto. The gauge 29 has surfaces 36 and 37 formed thereon which are parallel to the surfaces 33 and 34, respectively. Generally rectangular inserts 39—39 are secured within apertures 40—40 and 41—41 formed in the plates 16 and 22, respectively. The inserts 39—39 are preferably of copper but may be of any other material to which the welded parts will not adhere.

Cam members 43 and 44 are secured to plate 16 and cam members 45 and 46 are secured to plate 22. These cam members are similar to each other and for simplicity sake only cam member 45 will be described. The cam member 45 has cam surfaces 49 and 50 formed thereon and circular apertures 52 and 53 formed therein (Fig. 4). A cylindrical cam 55 is rotatably and eccentrically secured within the aperture 52 by a bolt 56 threaded into an aperture 58 formed in the plate 22. A flanged bolt 59 is threaded into an aperture 60 formed in the plate 22 and passes through the aperture 53, which is larger than the diameter of the threaded portion of the bolt 59. The flanged bolt 59 bears against the upper surface of the cam member 45 to hold the cam member 45 against the upper surface of the plate 22. The cam 55 has a handle 63 formed thereon by which the cam 55 may be rotated. The position of the eccentric cam 55 as shown in Fig. 1 is such that the cam member 45 is held as closely as possible to the upper right hand corner of the plate 22. If the cam 55 is rotated 180° from the position shown in Fig. 1, it, being eccentrically mounted on the bolt 56, will force the cam member 45 downwardly and to the left across the face of the plate 22. If, after this rotation, the cam 55 is rotated another 180° the cam member 45 will be forced upwardly and to the right to assume the position shown in Fig. 1. The enlarged aperture 53 permits limited movements of the member 45 about the bolt 59 therein but the cam member 45 is prevented by the bolt 59 from being rotated to any great extent about this bolt. The cam members 43, 44 and 46 are actuated in a manner similar to that just described.

Pins 64 and 65 are driven into suitable bores formed in the plate 22 along a line perpendicular to the arms 11 and 12 and to the surfaces 34 and 37. Pins 68 and 69 are mounted on suitable apertures formed in the plate 16 along a line parallel to that formed by the pins 64 and 65. Pins 71 and 72 are driven into suitable apertures in the plate 16, and pins 73 and 74 are similarly mounted in apertures formed in the plate 22 in a position so that pins 71 and 74 form a line parallel to the arms 11 and 12, as do the pins 72 and 73. The lines along which the pins 71 and 74, and 72 and 73 are located are perpendicular to the lines formed by the pins 64 and 65, and 68 and 69.

Similar gauges 76 and 77 are secured to the plate 16 on opposite ends thereof. Gauge 77 has a surface 78 formed thereon which surface is aligned with the surface 37. A plate 79 (Fig. 2) is mounted in a notch 80 formed in the gauge 77 by means of screws 81—81 which pass through elongated slots 82—82 formed in the plate 79, which plate has a bore 83 formed therein in alignment with a bore 84 formed in the gauge 77. A spring 87 fits into the aligned bores 83 and 84, and hence presses the plate 79 along the notch 80 in the gauge 77. A surface 88 is formed upon the plate 79 perpendicular to the surface 78 formed on the gauge 77 but parallel to the surfaces 33 and 36. A plate 89 is resiliently mounted upon the gauge 76 in a manner similar to that in which the plate 79 is mounted upon the gauge 77 and has a surface 90 formed thereon, in alignment with the surface 88 and parallel to the plate 16. A surface 91 is formed on the gauge 76 perpendicular to the surface 90 and in alignment with the surface 34.

Extensions 92, 93, 94 and 95 of the plates 16 and 22 have mounted thereon clamps 96, 97, 98 and 99, respectively. Since the clamps 96, 97, 98 and 99 are identical, only the clamp 98 will be described in detail. The clamp 98 (Fig. 3) consists of a pair of brackets 100—100 secured to the extension 94 and having pins 101 and 102 extending therebetween upon which are mounted a lever 103 and an L-shaped handle 104, respectively. The handle 104 has lugs 105—105 formed on the inner end thereof and a pin 106 passes through apertures in the lugs and through an elongated slot 107 formed in the lever 103. A transverse member 108 secured to the outer end of the lever 103 has formed thereon L-shaped arms 109—109. Bolts 110—110 are threaded into apertures formed in the arms 109—109 and may be secured in any adjusted position by nuts 111—111. The clamp 98 is shown in the closed or clamping position and the clamp 99 is shown in the open or unclamping position in which a lever 113 and a handle 114 are raised to vertical positions. To open the clamp 98 the handle 104 is rotated counterclockwise about the pin 102, as viewed in Fig. 3. During such rotation the pin 106 slides in the slot 107 and thereby causes the lever 103 to rotate in a clockwise direction about the pin 101 to a slightly overcenter position with respect to the pin 106 whereby the clamp, if undisturbed, will be retained in such a position. To reclose the clamp 98 from such a position, the handle 104 is rotated in a clockwise direction, as viewed in Fig. 3, and the pin 106 will force the lever 103 in a counterclockwise direction until it assumes the position shown in Fig. 3. When the clamp 98 is in the position shown in Fig. 3, the pin 106 will be slightly to the right of the pin 102 and will be in the outer extremity of the slot 107. Hence, if any upward force is exerted against the left end of the lever 103, the right end of the lever will bear downwardly against the pin 102 and thus tend to rotate the handle in a clockwise or unopening position. The clamp 98 will be held in its closed position until the handle is operated to open it.

In the operation of the above described fixture, the clamps 96, 97, 98 and 99 are all moved to the open position, as illustrated by clamp 99 as shown in the drawings. Cam members 43, 44, 45 and 46 are also all moved to retracted positions as illustrated by cam members 43, 44 and 46 in Fig. 1 of the drawings. Angle irons 121, 122, 123 and 124, which are to be welded together and have been cut to their desired lengths, are positioned within the clamping fixture so that their ends abut the surfaces 33, 34, 36, 37, 78, 88, 90 and 91, respectively. It will be seen that the angle irons 122 and 124 are resiliently held between the surfaces 90 and 33, and 88 and 36, respectively, since the plates 79 and 89 are resiliently mounted upon the gauges 77 and 76, respectively.

The cam members 43, 44, 45 and 46 are then moved by their respective cams so that the cam surfaces thereon are thrust against the angle irons to force the angle irons against the pins 64, 65, 68, 69, 71, 72, 73 and 74 to perfectly orientate the angle irons at right angles to each other. The cam members 43, 44, 45 and 46 are retained in their clamping positions as illustrated in Fig. 1 by the position of the cam member 45, which has been moved to that position by the rotation of the cylindrical cam 55 which is eccentrically mounted. During such movement of the cam member 45, the enlarged aperture 53 through which the smaller bolt 59 passes permits the cam member 45 to rotate about the cylindrical cam 55 a sufficient amount during the closing thereof that the member 45 will follow the lines of least resistance during such movement until both of the cam surfaces 49 and 50 have engaged and securely thrust the ends of angle irons 121 and 122 firmly against the pins 64 and 73.

The clamps 96, 97, 98 and 99 are then closed to maintain the angle irons 121, 122, 123 and 124 against the copper plates 39—39, after which welds 131—131 (Fig. 5) are formed in accordance with standard practice. The clamps 96, 97, 98 and 99 and the cam members 43, 44, 45 and 46 may then be released so that the resulting welded frame may be removed from the fixture and the above outlined steps may be repeated to make additional frames.

It will be observed that the ends of the angle irons at which the welds 131—131 are formed are positioned over the copper plates 39—39 so that the welds 131—131 will not adhere to the copper plates and the assembled angle irons may be easily removed.

If it is desired to use longer or shorter angle irons than angle irons 122 and 124, the bolts 27—27 and 28—28 may be unscrewed from the apertures in the members 11 and 12 and the frame 22 moved to a different position and secured in that position by threading the bolts into another of the series of apertures 17—17, 18—18, 20—20 and 21—21, respectively. Thus, the fixture may be adjusted to accommodate parts of different lengths.

The fixture embodying the invention facilitates the welding operation and the inserts of copper or other suitable material prevent the welded article from sticking to the fixture so that after the article has been welded together it may be removed readily. The angle irons are oriented with respect to each other and secured in this position during the welding operation so that the resulting frame is a perfect rectangle.

What is claimed is:

1. An article assembling fixture which comprises a pair of side frame members secured together in parallel relationship, an end frame member rigidly secured to the parallel members, a second end frame member adapted to be adjustably secured to the parallel members in a plurality of positions, each of said end frame members having recesses formed therein, copper plates secured in said recesses upon which plates portions of parts to be welded together may be positioned, aligned gauging pins secured to the frame members, a plurality of gauges secured to the first mentioned frame, each of which gauges has a resilient member mounted thereon, gauges secured to the second frame, a plurality of cam means secured to the frames to force a plurality of angle irons to be secured together against the gauging pins, and clamping means to force the angle irons against the end frames.

2. A fixture for welding frame assemblies, which comprises a rectangular frame, a plurality of stops secured thereto adjacent to the corners thereof, generally triangular plates slidably mounted on the frame adjacent to the corners thereof, cam means for sliding the plates against elements to be welded together to secure the elements in welding positions between the plates and the stops, and means mounted on the corners of the frame for clamping the elements to the frame in welding positions.

3. A fixture for welding frame assemblies, which comprises a rectangular frame, a plurality of stops secured thereto adjacent to the corners thereof, a plurality of plates having a plurality of cam surfaces thereon, means for securing the plates to the frame adjacent to the corners thereof and permitting sliding of the plates toward and away from the corners of the frame and limited lateral movement thereof, and a cam for actuating each plate, whereby when two elements are placed on the frame at a right angle to each other and the plates are moved by the cam toward the corners of the frame, the cam surfaces thereon engage and firmly clamp the elements against the stops.

4. A fixture for welding frame assemblies, which comprises a platform, a plurality of stops extending perpendicularly from the top of the platform, a cam member for forcing a plurality of elements to be assembled against the stops, means for actuating the cam member, and means for clamping against the top of the platform a plurality of elements held by the cam member against the stops.

5. A fixture for welding frame assemblies, which comprises a platform, a plurality of stops secured thereto at predetermined points thereon, a plurality of plates having projections formed thereon slidably mounted on the platform adjacent to the stops, and means for sliding the plates against elements positioned on the platform to be welded together to secure the elements in welding positions between the projections and the stops.

6. A fixture for welding frame assemblies, which comprises a platform, a plurality of stops secured to the platform, a plate having element-engaging lobes formed thereon slidably mounted on the platform, and an eccentric cam for sliding the plate toward the stops, whereby a plurality of elements to be welded together may be secured to the platform between the stops and the lobes.

7. A fixture for welding frame assemblies, which comprises a platform, a pair of stops projecting from the platform, a plate having a pair of article-engaging surfaces formed thereon, means for mounting the plate on the platform for sliding and pivotal movement of the plate relative to the platform, and means for sliding the plate simultaneously toward both of the stops.

8. A fixture for welding frame assemblies, which comprises a platform, a pair of stops projecting from the platform on opposite sides of a corner thereof, a plate having a pair of article-engaging lobes formed thereon, a cam for securing the plate on the platform for sliding and rotating movement relative to the platform, and means for rotating the cam to slide the plate simultaneously toward both of the stops.

CHARLES H. TRIMBLE.

REFERENCES CITED

The following references are of record in the file of this patent:

UNITED STATES PATENTS

| Number | Name | Date |
|---|---|---|
| 1,642,549 | Jarecki | Sept. 13, 1927 |
| 1,759,036 | Brantingham | May 20, 1930 |
| 2,047,190 | Blickman | July 14, 1936 |
| 2,095,964 | Blickman | Oct. 19, 1937 |
| 1,604,483 | Roberts | Oct. 19, 1937 |
| 2,176,664 | Burke | Oct. 17, 1939 |
| 1,840,737 | Peck | Jan. 12, 1932 |
| 1,765,235 | Keffer | June 17, 1930 |
| 1,159,279 | Schaefer | Nov. 2, 1915 |
| 1,755,284 | Colt | Apr. 22, 1930 |
| 364,491 | Davis | June 7, 1887 |
| 902,491 | Ireland | Oct. 27, 1908 |

FOREIGN PATENTS

| Number | Country | Date |
|---|---|---|
| 403,892 | German | Oct. 9, 1924 |
| 82,232 | German | Dec. 25, 1894 |